(12) United States Patent
Larson

(10) Patent No.: US 12,204,962 B2
(45) Date of Patent: Jan. 21, 2025

(54) POSITIVE IMAGE BAR CODE ON FLEXIBLE MEDICAL SOLUTION CONTAINER

(71) Applicant: Fenwal, Inc., Lake Zurich, IL (US)

(72) Inventor: Christine M. Larson, Cary, IL (US)

(73) Assignee: Fenwal, Inc., Lake Zurich, IL (US)

( * ) Notice: Subject to any disclaimer, the term of this patent is extended or adjusted under 35 U.S.C. 154(b) by 0 days.

(21) Appl. No.: 17/783,972

(22) PCT Filed: Dec. 9, 2020

(86) PCT No.: PCT/US2020/063913
§ 371 (c)(1),
(2) Date: Jun. 9, 2022

(87) PCT Pub. No.: WO2021/119067
PCT Pub. Date: Jun. 17, 2021

(65) Prior Publication Data
US 2023/0024113 A1 Jan. 26, 2023

Related U.S. Application Data

(60) Provisional application No. 62/971,345, filed on Feb. 7, 2020, provisional application No. 62/946,232, filed on Dec. 10, 2019.

(51) Int. Cl.
*G06K 1/12* (2006.01)
(52) U.S. Cl.
CPC .................................. *G06K 1/121* (2013.01)
(58) Field of Classification Search
CPC .................................................. G06K 1/00–22

(Continued)

(56) References Cited

U.S. PATENT DOCUMENTS 5,896,989 A 4/1999 Ropiak et al.
2006/0255146 A1 11/2006 Mase et al.
(Continued)

FOREIGN PATENT DOCUMENTS

| CN | 1118904 A | 3/1996 |
| JP | H0681049 U | 11/1994 |
| WO | 2014108534 A1 | 7/2014 |

OTHER PUBLICATIONS

European Supplementary Search Report EP 20900612.1 with written opinion issued Jan. 10, 2024.

(Continued)

*Primary Examiner* — Jamara A Franklin
(74) *Attorney, Agent, or Firm* — Cook Alex Ltd.

(57) ABSTRACT

Printing a code on a flexible medical solution container includes providing a flexible medical solution container which is at least partially light transmissive, storing in a memory circuit a code comprising numbers and translating the code comprising numbers using a bar code symbology, the bar code symbology defining dark areas and light areas. The method includes applying a light-reflective ink to the container based on the bar code symbology, wherein the light-reflective ink is applied in areas defined by the dark areas, and applying a light-absorbing ink to the container based on the bar code symbology, wherein the light-absorbing ink is applied in areas defined by the light areas. The applied light-reflective ink and light-absorbing ink results in a code which represents a reversal of the dark and light areas defined in the bar code symbology.

16 Claims, 8 Drawing Sheets

(58) Field of Classification Search
USPC .................................................. 235/494, 491
See application file for complete search history.

(56) References Cited

U.S. PATENT DOCUMENTS

| | | |
|---|---|---|
| 2007/0125870 A1 | 6/2007 | Mase et al. |
| 2013/0301870 A1 | 11/2013 | Mow et al. |
| 2017/0193260 A1 | 7/2017 | Prusik et al. |
| 2017/0200035 A1* | 7/2017 | Teraura ................ G06K 7/1447 |
| 2018/0121775 A1 | 5/2018 | Sharma et al. |

OTHER PUBLICATIONS

International Search Report PCT/US2020/063913 with written opinion issued Feb. 26, 2021.

Wang et al. "Fast fabrication of flexible functional circuits based on liquid metal dual-trans printing." In: Advanced Materials. Sep. 2015 (Sep. 2015) Retrieved on Jan. 30, 2021 (Jan. 30, 2021) from <https://www.researchgate.net/profile/Yang_Yu40/publication/282346664Fast_Fabrication_of_Flexible_Functional_Circuits_Based_on_Liquid_Metal_Dual-Trans_Printing/links/5660eafe08ae4931cd59b108.pdf> entire document.

* cited by examiner

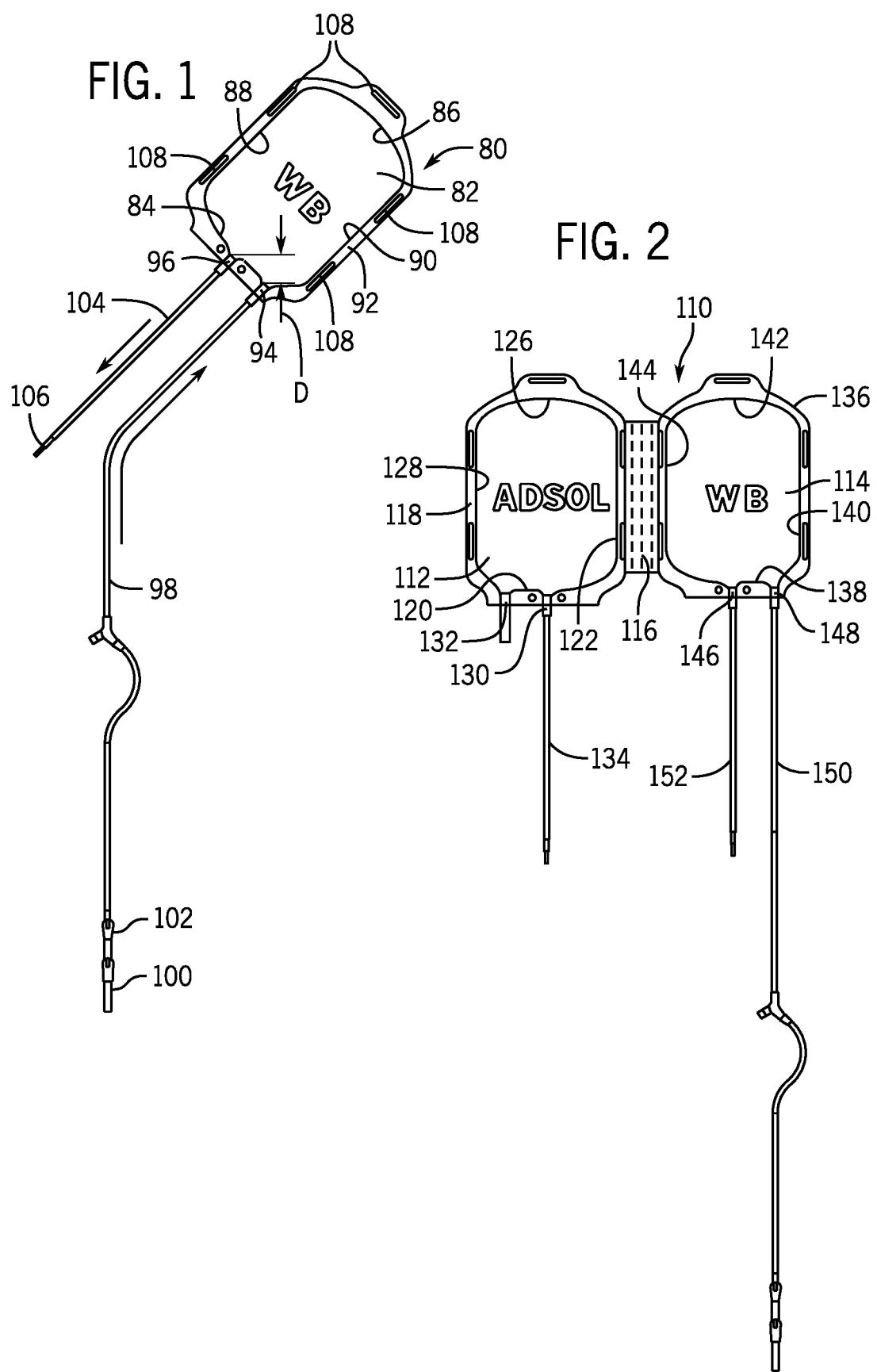

UPC-A BARCODE
COMPONENTS

POSITIVE IMAGE BAR CODE ON FLEXIBLE MEDICAL SOLUTION CONTAINER

CROSS-REFERENCE TO RELATED APPLICATIONS

This application is the U.S. National Stage Application of PCT Application PCT/US2020/063913, filed Dec. 9, 2020, which claims the benefit of and priority to U.S. Provisional Patent Application Ser. No. 62/946,232, filed Dec. 10, 2019 and U.S. Provisional Patent Application Ser. No. 62/971,345, filed Feb. 7, 2020 the contents of which are incorporated herein by reference.

BACKGROUND

The present application relates to printing codes on substrates. The present application relates more particularly to printing bar codes on flexible product containers, such as medical solution containers.

Medical solutions include a variety of liquid solutions used in the medical field. Medical solutions comprise saline, sodium citrate, anticoagulant, such as a solution of sodium citrate, phosphate and dextrose, or other solutions. Medical solutions also comprise biological products, such as urine or blood products, such as plasma, whole blood, white blood cells, platelets, etc. Medical solutions also include various medicaments, such as drugs. Medical solutions are packaged in flexible plastic containers for transport. Bar coding is used to track inventory and use of these medical solution containers. Medical solution containers are typically at least semi-transparent, making for a substrate having particular characteristics that must be taken into account when printing bar codes thereon.

In one method, an opaque coating having a reflective color is applied to a surface of a web of transparent material. The coating is applied in a bar code pattern in which non-reflective bars are defined by uncoated strip regions of the web and in which reflective spaces between the bars are defined by the opaque coating. Thus, instead of printing the dark areas of a bar code, this method prints the white areas of the bar code and relies on the transparent material to absorb light for the dark areas of the bar code.

BRIEF DESCRIPTION OF THE DRAWINGS

The accompanying drawings illustrate various embodiments in which:

FIG. 1 is a top view of a medical solution container, according to an illustrative embodiment;

FIG. 2 is top view of a medical solution container, according to a second illustrative embodiment;

Figure 3:
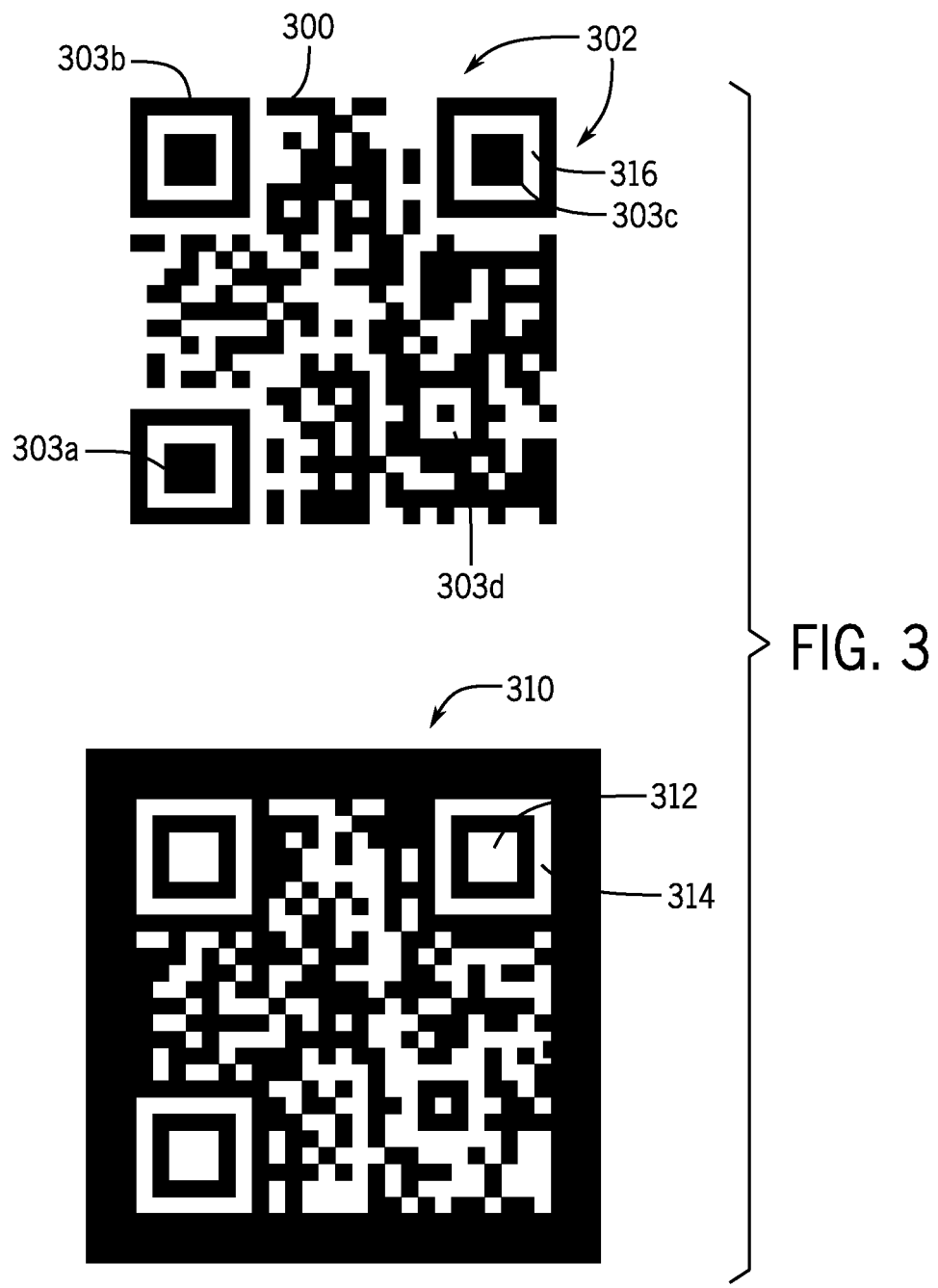
FIG. 3 is an illustration of a OR code (left) and a OR code printed with reverse reflectance (right), according to an illustrative embodiment.

The various features of the embodiments disclosed herein showing novel construction, combination, and elements as described, and more particularly defined by the claims, it being understood that changes in the embodiments of the disclosed invention are meant to be included as coming within the scope of the claims.

DETAILED DESCRIPTION OF ILLUSTRATIVE EMBODIMENTS

In some embodiments, a bar code symbol may be printed without the need for a two-color printing process.

In some embodiments, a white or light colored positive image is printed on a plastic medical solution container in a one-color or two-color printing process.

In some embodiments, a white or light positive image and a black or dark negative image are printed on a flexible plastic container.

In some embodiments, a bar code is printed on a transparent solution container in compliance with a Food and Drug Administration (FDA) regulation while minimizing production cost and minimizing technical challenges associated with a two-color printing process.

In some embodiments, a positive image in light-reflecting ink is printed in an area defined to be dark areas by a coding symbology. In some embodiments, the light-reflecting ink is printed directly on the plastic container and the unprinted areas between the light-reflecting ink comprise dark areas that are associated with light areas by the coding symbology.

In another advantageous aspect, it may be easier to use a one-color printing process to form a bar code complying with a quality standard than to use a method in which two printing steps are to be aligned with each other on the substrate.

In some embodiments, the linear bar code may be generated to comply with a National Drug Code symbology and may further comprise at least ten digits.

In various embodiments, the light-reflecting ink may be referred to as a positive bar code image printed on the substrate, wherein the light-reflecting ink positively represents dark areas defined by a symbology standard.

In some embodiments, the light and dark areas of a bar code are inverted relative to a symbology standard when printed on a flexible plastic bag.

As an example of reflectance reversal, in the case where a stored symbology defines a two-dimensional bar code having a light quiet zone surrounding a data zone, a computer may be configured to translate the code based on a symbology such that a light-absorbing ink is applied to the light quiet zone.

According to various embodiments, light-reflecting ink may be white or other colors such as yellow selected to reflect more light than adjacent dark areas. Light-absorbing ink may be black, brown or other colors selected to absorb more light than adjacent light areas.

In some embodiments, one of the light-absorbing and light-reflecting inks may be printed first and the other of the inks may be printed within the spaces left between the areas printed with the first of the inks.

In one embodiment, a method of printing a code on a flexible medical solution container may comprise printing a linear bar code in white or light-reflecting ink according to a national drug code (NDC) symbology, wherein light-reflecting ink is printed in areas identified as dark areas by the NDC symbology.

In one embodiment, a method may comprise printing a positive image of either a linear or 2D bar code in a white ink or light reflecting material on transparent containers such as flexible plastic bags used to contain solutions for medical procedures.

In some embodiments, a bar code scanner may be configured to translate by inverting data in a data file representing a digital image of the bar code and using the bar code definition or symbology in the memory to convert the inverted data to the numeric code. For example, a processing circuit may first receive the scanned image data, then invert or reverse any pixels indicated as being light to indicate them as being dark and vice versa. This inverted image data may then be processed according to the symbology stored in a memory circuit to determine the numeric or alphanumeric data encoded by the bar code.

In some embodiments, the bar codes described herein may be generated according to a symbology, which defines the mapping between messages or codes and bar codes. The specification of a symbology may include the encoding into bars (dark areas) and spaces (light areas) a message and/or any of the following: start and/or stop markers, the size of a quiet zone required to be before and/or after the bar code, the computation of any checksums, and/or other specifications for the bar code.

In some embodiments, a two dimensional bar code may be printed according to a OR code format. One aspect of a two dimensional symbology may define a square quiet zone of a predetermined thickness around other elements of the OR code. The quiet zone is defined in the symbology to be a light area. Another aspect of the symbology defines three distinctive squares at the corners of the OR code image, using a smaller square near the fourth corner to normalize the image for size, orientation and angle of viewing for the scanning camera. A square comprises a dark solid central square within a light outlined square of a first predetermined thickness within a dark outlined square of a second predetermined thickness. Other aspects of the OR code symbology may comprise an error correction algorithm, encoding format, encoding modes, etc., any one or more of which may be reversed by a scanner before decoding pursuant to the symbology.

In some embodiments, a bar code may be printed directly to a surface of the substrate (without any material between the ink that is printed and the flexible substrate), or the bar code may be printed on a label which is applied to the flexible substrate.

FIG. 1 is a top view of a medical solution container, according to an illustrative embodiment. The teachings herein may be applied to various substrates, such as flexible or rigid substrates. The substrates may be transparent or translucent or semi-transparent or opaque substrates. The substrates may comprise or be fabricated using plastic or polymer substrates, such as polyvinylchloride or other thermoplastic polymers, or plasticizer-free materials such as DEHP-free polymers. The substrates may be formed into a container configured to hold a fluid, which may be a medical fluid (e.g., blood product, medicament, nutrition, saline, sodium citrate, additive, anticoagulant, etc.) or non-medical fluid. The blood product may comprise a red blood cell product, a platelet product, a plasma product, a white blood cell product, etc. The fluid contained therein may itself be transparent or translucent or semi-transparent or opaque.

The fluid may be body fluids other than blood, such as urine. The container may be fabricated with one or more ports for coupling to tubing segments or lengths of tubing, spike ports, twist-off ports, luer connections, needles, other containers, additive pouches, etc.

The container 80 is formed from a pair of facing flexible plastic films or sheets 82, which may be made of any suitable heat-sealable material such as, but not limited to, polyvinylchloride. The container has an internal cavity with a first end 84, opposed second end 86, first side 88 and opposed second side 90, The sheets are sealed together, as by radio frequency (RF) or heat seal, along a seal line 92 that extends around the entire periphery of the container and is uninterrupted except for inlet port 94 and outlet port 96 located at the first end 84 of the container cavity. The position of the ports may vary, but in the illustrated embodiment, the inlet port 94 is between the outlet port and the second side 90 of the container, and preferably substantially adjacent to a corner or junction between the first end 84 and second is side 90. The outlet port 96 is illustrated as being generally midway between the first and second sides. Alternatively, it should be noted that ports 94 and 96 may be either inlet or outlet ports, depending on intended usage.

Inlet port 94 is connected to inlet flow tubing 98, which extends to a pre-attached venous access device 100, such as a needle, or to a connector, such as a standard luer lock, for connection to a needle. The inlet flow tubing 98 may have additional ports or connection sites as desired, such as for pre-donation sampling or the like. It may also include an internal frangible valve 102 that normally blocks flow through the tubing and can be opened by manual manipulation or bending of the tubing.

Outlet fluid flow tubing 104 extends from the outlet port 96 to a sealed distal end 106. The tubing 104 has a length sufficient to extend from the container 80 to a sterile connection device located on an electromechanical blood processing device (not shown), such as an apheresis device, such as a plasmapheresis device. Exemplary blood processing devices may include Amicus, Alyx and Aurora centrifuge systems, sold by Fenwal, Inc., Lake Zurich, Ill.

Hanging apertures, shown as slits 108, are provided in the seal line 92 to allow for suspending the container, such as from a weight scale hook as employed in the blood processing device. The slit 108 located in the second end 86 of the container 80 allows the container to be suspended vertically and the slits along the sides of the container allow it to be suspended so that it hangs in a direction other than vertically, such as horizontally or at an downward angle such as shown in FIG. 1, where the inlet port 94 is slightly lower than the outlet port 96 by distance D. Hanging in this position allows any solids in the collected blood, such as clots, to settle away from the outlet port, and helps avoid blocking of the outlet flow tubing 104 by such solids or introduction of such solids into downstream processing system components.

FIG. 2 shows an integrated container system 110 having two discrete container cavities—an additive solution cavity within container 112 and a whole blood collection cavity within container 114. The cavities or containers are integrally joined by intermediate web 116. The additive solution may comprise a saline solution, a saline-adenine-glucose solutions (SAGM), an AS-3 solution containing citrate and phosphate, or other additive solutions.

The integral containers are formed of two facing flexible plastic sheets or films, sealed together such as by RF or heat sealing. Each container is defined by a separate seal line and is generally rectangular in configuration with opposed ends and sides. The additive solution container or cavity 112 is formed by seal line 118 that extends along first end 120, first side 122, second end 126 and second side 128. The seal line is uninterrupted except for outlet port 130 and access port 132 in the first end of the container. The access port allows for the addition of additive fluid into the container 112 during manufacture, and outlet port 130 is attached to a length of fluid flow tubing 134 sealed at the distal end for connection, preferably sterile connection, to a processing set or module.

The whole blood container or cavity 114 is formed by seal line 136 that extends along first end 138, first side 140, second end 142 and second side 144. The seal line is uninterrupted except for outlet port 146 and inlet port 148 in the first end of the container. The inlet port 148 allows the inflow of whole blood during collection, and the outlet port directs fluid flow to a downstream processing set or module. The inlet port 148 also allows the addition of anticoagulant solution into the container during manufacturing. Inlet flow tubing 150 extends from the inlet port, and outlet tubing 152 extends from the outlet port. The inlet and outlet tubing 150 and 152 may be configured similarly to the inlet flow tubing 98 and outlet flow tubing 104 described earlier with respect to the container in FIG. 1.

The first side 122 of the additive solution container 112 is attached to the second side 144 of the blood container 114 by the integral intermediate web 116 that is part of original plastic sheets used in forming the containers and extends between the containers. This web may be of such width as desired and allows the containers to be folded into a more compact arrangement if desired for shipping or handling.

Figure 8:
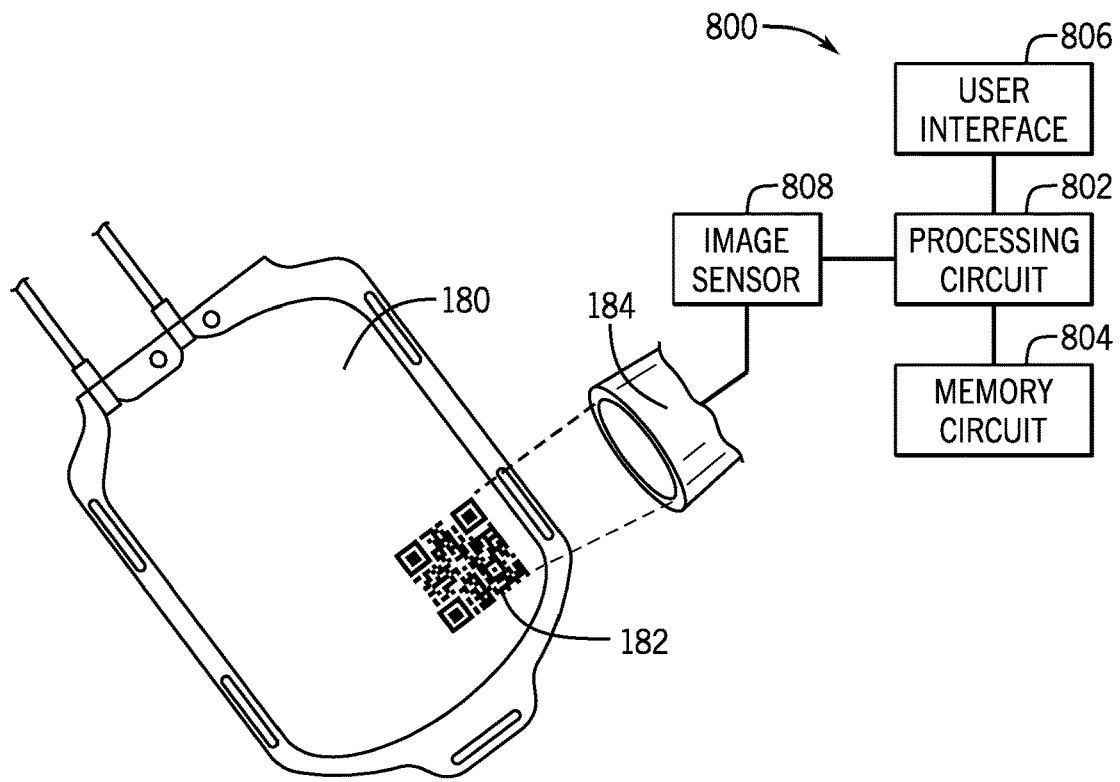
FIGS. 8 and 9 are top perspective views of medical solution containers bearing bar codes being scanned by a scanner, according to illustrative embodiments.

As shown in FIG. 8, a container 180 or a flexible substrate thereof may be printed with a bar code 182 to be used for tracking and inventory purposes. The bar code may be printed directly to a surface of the substrate (without any material between the ink that is printed and the flexible substrate), or the bar code may be printed on a label which is applied to the flexible substrate. The label may be transparent or translucent or semi-transparent or opaque. The bar code may be a linear bar code, a two dimensional bar code, or a bar code in another bar code format. A linear bar code or one dimensional bar code is not limited to a particular code format, specification or standard, but refers to a code comprising lines and spaces of various widths that create specific patterns. One example of a linear bar code is Code 128 of international standard ISO/IEC 15417. A two dimensional bar code is not limited to a particular code format, specification or standard, but refers to a two dimensional representation or matrix, that contains or encodes information based on dark and light spots or areas (also called bars) within the matrix, which matrix is typically but not exclusively square or rectangular, and in contrast to a one-dimensional bar code based on a series of lines and spaces. A bar of a two dimensional bar code may be a square pixel which is either dark or light colored. A two dimensional bar code may be employed that contains pertinent manufacturer's data in a location on a container or container label that is preferably facing or otherwise visible from a fixed scanner on the blood processing device. The stored or encoded information may include, without limitation, any one of the manufacturer's part number or catalogue number for the container or module, lot number, expiration date, product code for the blood product to be contained in it and other such information, alone or in any desired combination. A part number or catalogue number may be particularly beneficial to encode, either alone or in combination with a product expiration date. Optionally, the bar code may include any additional manufacturer information required or allowed by the United States Consensus Standard for the Uniform Labeling of Blood and Blood Components. In one example, the two dimensional bar code may conform to a GS1 Datamatrix symbology pursuant to an ISO/IEC 16022 standard.

The bar codes described herein may be generated according to a symbology, which defines the mapping between messages or codes and bar codes. The specification of a symbology may include the encoding of the message into bars (dark areas) and spaces (light areas) and/or any of the following: start and/or stop markers, the size of a quiet zone required to be before and/or after the bar code, the computation of any checksums, and/or other specifications for the bar code.

Referring to FIG. 3, the image at the left is that of a two dimensional bar code according to a OR code format, according to an exemplary embodiment. One aspect of the symbology defines a square quiet zone 302 of a predetermined thickness around other elements of the OR code. The quiet zone is defined in the symbology to be a light area. Another aspect of the symbology defines three distinctive squares at the corners of the OR code image 303*a*, 303*b*, 303*c*, using a smaller square 303*d* near the fourth corner to normalize the image for size, orientation and angle of viewing for the scanning camera. Each square 303*a*, 303*b* and 303*c* comprises a dark solid central square within a light outlined square of a first predetermined thickness within a dark outlined square of a second predetermined thickness. Other aspects of the OR code symbology may comprise an error correction algorithm, encoding format, encoding modes, etc.

Figure 4:
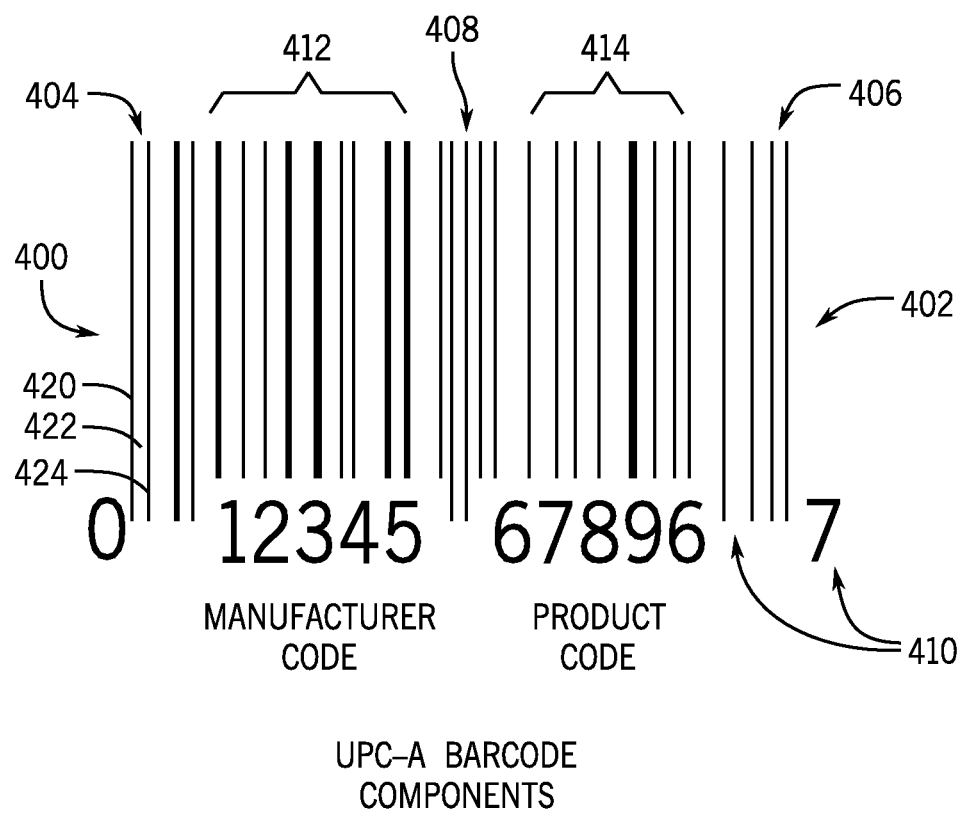
FIG. 4 is an illustration of a linear bar code, according to an illustrative embodiment.

Referring to FIG. 4, a linear bar code is shown according to an illustrative embodiment. A symbology for this linear bar code defines a left quiet zone 400 and a right quiet zone 402 being light areas of predetermined minimum thickness, left hand and/or right hand leading indicators or guard bars 404, 406, a center bar pattern 408, a modulo check character 410, and a plurality of number system characters 412, 414. The bar code may be a UPC-A Bar code. In one example, a leading indicator 404 may comprise a first dark area 420 followed (left to right) by a first light area 422 followed by a second dark area 422. The areas may be elongated bars or lines, or other shaped areas. The leading indicator 404 provides an indication to a scanner that the next bars will begin a series of bars encoding data.

The number system characters 412, 414 may provide alternating light and dark areas or bars of one or more predetermined thicknesses to encode individual numerical digits. For example, the number 1 may be represented by a light bar which is two units wide followed by a dark bar which is two units wide followed by a light bar which is two units wide followed by a dark bar which is one unit wide. Thus, the symbology for this bar code may define the number 1 as 2-2-2-1. The symbology may define the number 2 as 2-1-2-2 (a light bar two units wide followed by a dark bar one unit wide followed by a light bar two units wide followed by a dark bar two units wide). The number system characters 412 to the left of the center bar pattern 408 each begin with a light bar (reading from left to right), while the number system characters 414 to the right of the center bar pattern 408 each begin with a dark bar (reading from left to right). The symbology for the bar code thus defines light areas and dark areas that encode data of different types using a predetermined mapping.

Figure 5:
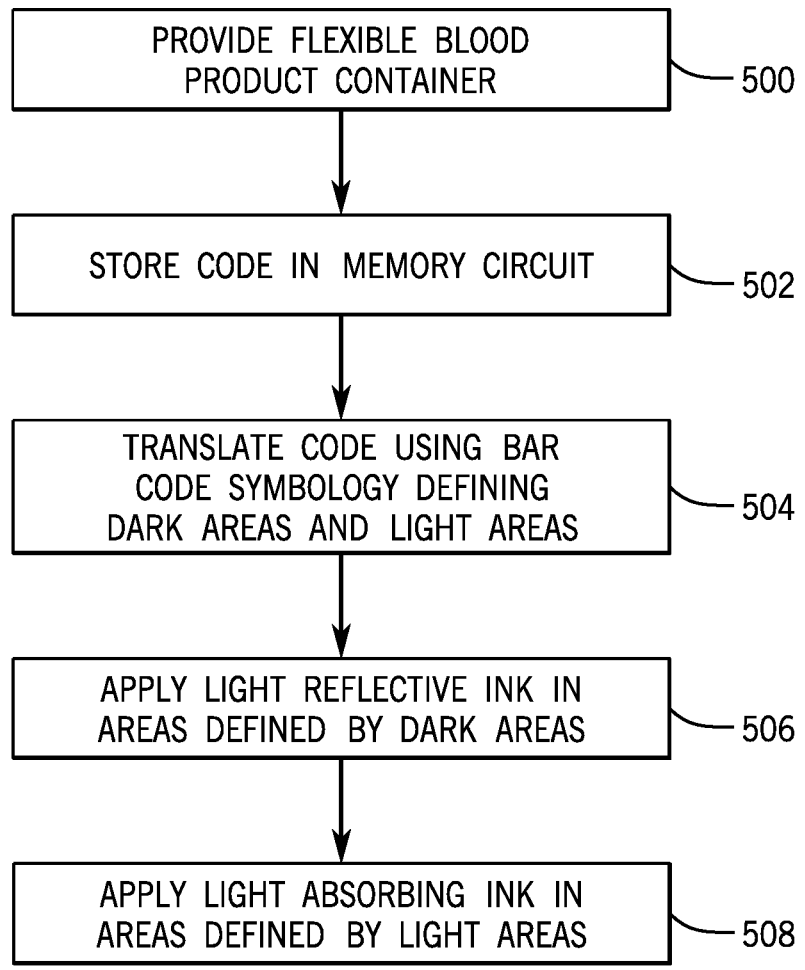
FIG. 5 is a flowchart illustrating a method of printing a code on a flexible medical solution container, according to an illustrative embodiment.

Referring now to FIG. 5, a method of printing a code on a flexible medical solution container will be described, according to an illustrative embodiment. At a block 500, a flexible medical solution container is provided which is at least partially light transmissive. The container may be fabricated as described herein or using other fabrication techniques and provided manually, via a conveyor, or by other methods to a printing station. The printing station may comprise hot-stamp printer, a laser printer, an ink-jet printer, a flexographic printer, a thermal printer; a thermal transfer printer, or other printing technology, Under control of an integral or separate computer, the printing station may be configured to store in a memory circuit a code comprising numbers, alphanumeric characters, letters, symbols, or other data to be converted or translated to a bar code to be printed (block 502). At a block 504, a processing circuit of the computer may be configured to translate the code or other data stored in the memory circuit into dark and light areas to be printed using a bar code symbology. The bar code symbology may be stored in data format in the memory circuit (which may comprise one or more memories). As discussed herein the symbology may define dark areas and light areas.

At a block 506, the computer is configured to control the print station to apply a light-reflective ink to the container based on the bar code symbology, wherein the light-reflective ink is applied in areas defined by the symbology to be dark areas. At a block 508, the computer is configured to control the print station to apply a light-absorbing ink to the container based on the bar code symbology, wherein the light-absorbing ink is applied in areas defined by the symbology to be light areas. These blocks 506 and 508 describe a reversal of the areas defined in the bar code symbology. For example, in the case where the symbology defines a leading indicator of a first dark area followed by a first light area followed by a second dark area, at blocks 506, 508 the computer is configured to control the print station to print or apply a light-reflective ink (to make a light area according to the symbology) to the first and second dark areas and to print or apply a light-absorbing ink (to make a dark area according to the symbology) to the first light area. The applied light-reflective ink and light-absorbing ink results in a code which represents a reversal of the dark and light areas defined in the bar code symbology.

The light absorbing ink may be completely opaque or partially opaque such that a portion of the light striking the ink is absorbed and a portion is transmitted through the ink. In some embodiments, an object can still be seen through the light absorbing ink.

Referring now to FIG. 3, a bar code 310 is an example of a two-dimensional bar code which can be printed according to the method of FIG. 5 based on a QR code symbology. As shown, a square 312 is printed with light-reflecting ink at an area defined to be a dark central square by the QR code symbology (shown at left, inside portion of square 303*c*). A light outlined square 314 is printed with light-reflecting ink at an area 316 defined to be a dark outlined square by the QR code symbology. Thus, bar code 310 is printed with reflectance reversal which prints light-reflecting ink at locations defined by the symbology as having dark areas and which prints light-absorbing ink at locations defined by the symbology as having light areas. Stated another way, the dark elements of the QR code are positively printed with light-reflective ink to provide a positive image of the QR code with light-reflective ink.

The reversal of dark and light inks relative to the symbology may be done with respect to all of the elements of the code printed, or with respect to only some of the elements of the code printed.

In various embodiments, the light-absorbing ink may be printed before the light-reflecting ink in separate passes through a printer or through several printers. Alternatively, the light-reflecting ink may be printed before the light-absorbing ink. Alternatively, both inks may be printed simultaneously using a dual-print head. In some embodiments, one of the light-absorbing and light-reflecting inks may be printed first and the other of the inks may be printed within the spaces left between the areas printed with the first of the inks. In another embodiment, a solid dark background may be printed first directly on the substrate and then light-reflecting elements may be printed onto the dark background.

Figure 6:
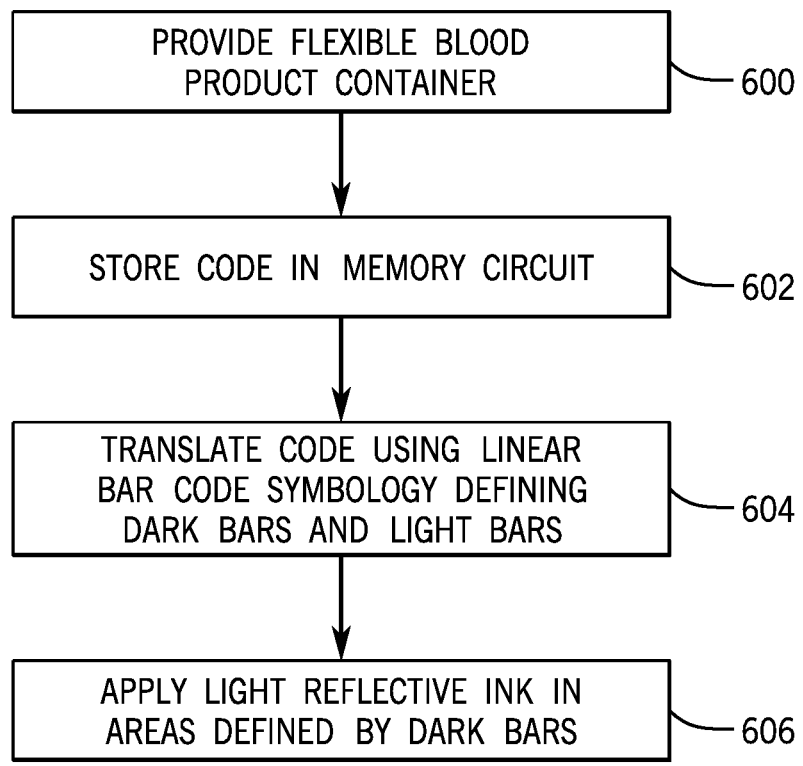
FIG. 6 is a flowchart illustrating a method of printing a linear bar code on a flexible medical solution container, according to an illustrative embodiment.

Referring now to FIG. 6, a method of printing a linear bar code on a flexible medical solution container will be described according to an alternative embodiment. At a block 600, a flexible medical solution container is provided which is at least partially light transmissive. In some embodiments the container may be empty and in alternative embodiments the container may comprise an additive solution to be added to the blood product. In still other embodiments, the container may be full of the blood product and optionally an additive solution when printed. At a block 602, a code comprising numbers is stored in a memory circuit. The code may be loaded into the memory circuit from a network circuit from a remote computer, using a memory stick or memory card, entered via a user input device of a computer console, or using other methods or devices.

At a block 604, a processing circuit is configured to retrieve the code from memory and translate the code comprising numbers using a linear bar code symbology, the linear bar code symbology defining dark lines and light lines bars, such as those illustrated in FIG. 4, though any other linear bar code or one dimensional bar code symbology may be used in various embodiments. At a block 606, a printer is configured to, under control of the processing circuit, print light reflective ink or otherwise create light reflective portions or areas in the areas defined as dark areas by the symbology. In this embodiment, a dark reflective ink need not be applied because the properties of the container itself are designed to be sufficiently absorbent of light to provide the necessary contrast with the applied light reflective portions. For example, printing a light colored ink such as a white ink or yellow ink will cause the areas so printed to substantially reflect light while the areas left unprinted will absorb light by the container material selected, the additives within the container, and/or the blood product within the container.

In one advantageous aspect, only a single printing step is needed to form the bar code in the embodiment of FIG. 6. The applied light-reflective ink may provide a scannable linear bar code without printing a different color of ink for the linear bar code.

In another alternative embodiment, a black label or solid background block may be printed to improve the light-absorbing qualities of the substrate, after which light-reflecting ink is printed on the black label (and therefore not directly on the substrate) to provide the positive image of the bar code with reflectance reversal.

One or more of the blocks, features, and/or characteristics of the method of FIG. 6 may be incorporated into or replace blocks, features and/or characteristics of the method of FIG. 5 and vice-versa.

Figure 7:
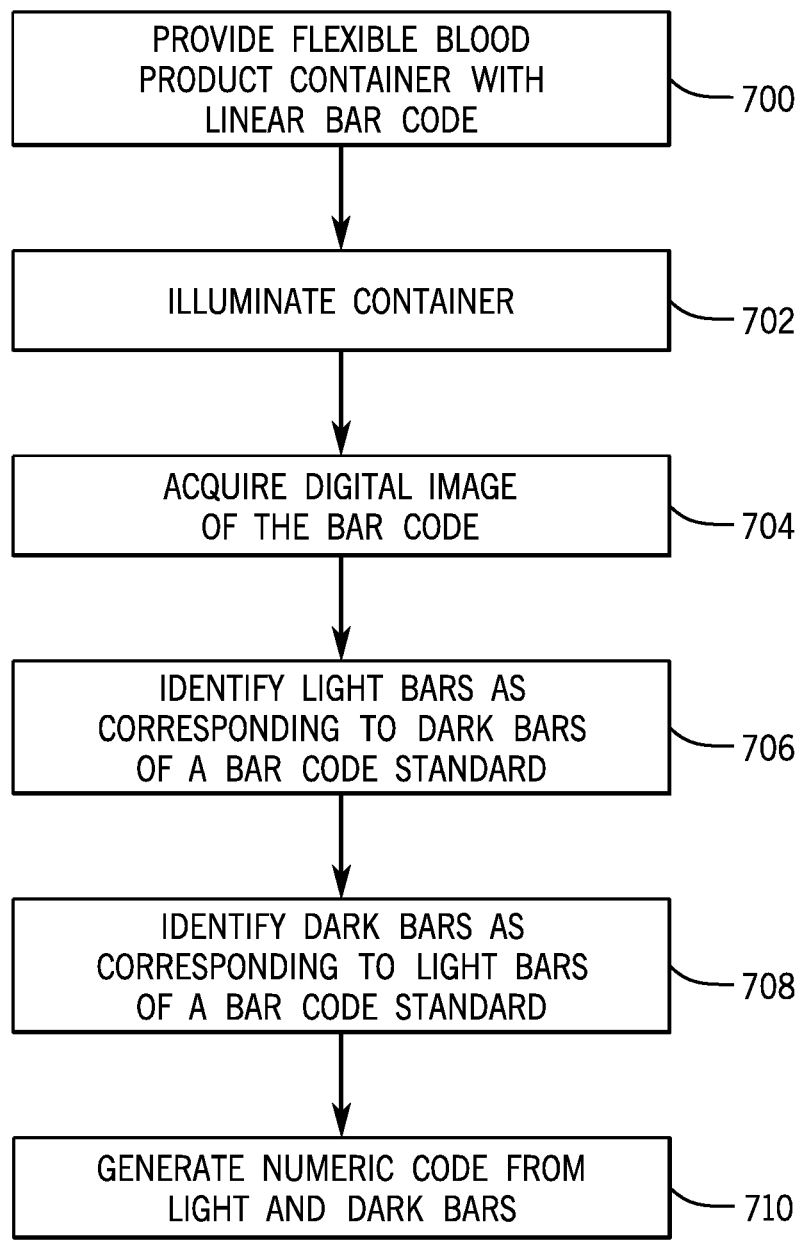
FIG. 7 is a flowchart illustrating a method of scanning a bar code from a medical solution container, according to an illustrative embodiment.

Referring now to FIG. 7, a method of scanning a code printed on a flexible medical solution container will be described. A scanner may take a variety of forms, such as a handheld scanner, a smartphone or other mobile telephone running a scanner application downloaded over a network, an apheresis device comprising a built-in scanner (see e.g., FIG. 10), or other forms. The scanner may be configured to read a positive image printed in white ink on transparent plastic containers for liquid products used in medical procedures such as donations, treatments, etc.

At a block 700, a flexible medical solution container is provided having a linear bar code printed thereon. The linear bar code may be a positive image of a bar code printed in light reflecting ink, a reverse reflectance bar code, a bar code printed or applied pursuant to one or more of the steps described herein with reference to FIGS. 5 and/or 6, or other bar codes. At a block 702, the container is illuminated with light from a light source. The light may comprise light in any of a number of spectral ranges, such as visible light, infrared light, ultraviolet light, etc. The light is reflected off the linear bar code printed on the container at least partially. Light may be absorbed and/or transmitted by a medical solution contained in the container and/or the flexible material of the container.

At a block 704, a digital image is acquired of the bar code. The digital image may be acquired by a scanner or reader configured to take an image of the printed or applied bar code, decode the data contained in the bar code pursuant to a bar code symbology, and send the data to a processing circuit of a computer. The scanner may have an integral light source and other optical components, such as a lens, light sensors, etc. The scanner may comprise a decoder circuit configured to analyze the bar code's image data provided by a sensor. The scanner may comprise a pen-type reader in which a photodiode is swiped across a code, a laser scanner, a CCD or LED scanner, a camera-based reader, a video camera reader, an omnidirectional bar code scanner, a cell phone camera, a PDA or Auto-ID PDA scanner, and the scanner may be a cordless or wireless scanner and may be configured to be held in a person's hand or may be larger than a handheld size.

At blocks 706 and 708, the processing circuit of the scanner is configured to identify light-reflecting or lighter bars of the scanned bar code as corresponding to dark bars of a bar code symbology standard. The processing circuit is configured to identify light-absorbing or darker bars of the scanned bar code as corresponding to light bars of the bar code symbology standard. In one option, the processing circuit may be configured to reverse dark and light areas of the symbology standard and store the reversed symbology standard in memory circuit, and then compare scanned data to the reversed symbology standard. An imaging scanner may be configured to take a picture of a bar code image, digitally process it and compare the image to known patterns.

At a block 710, a numeric code is generated by the processing circuit and/or decoder circuit from the bar code standard and the identified light bars and dark bars. The code may be alphanumeric, numeric, or other forms of data.

In various embodiments, the method of FIG. 7 may comprise filling the container with and/or emptying the container of the medical solution prior to the blocks shown, after the blocks shown, or between any two of the blocks shown.

Figure 9:
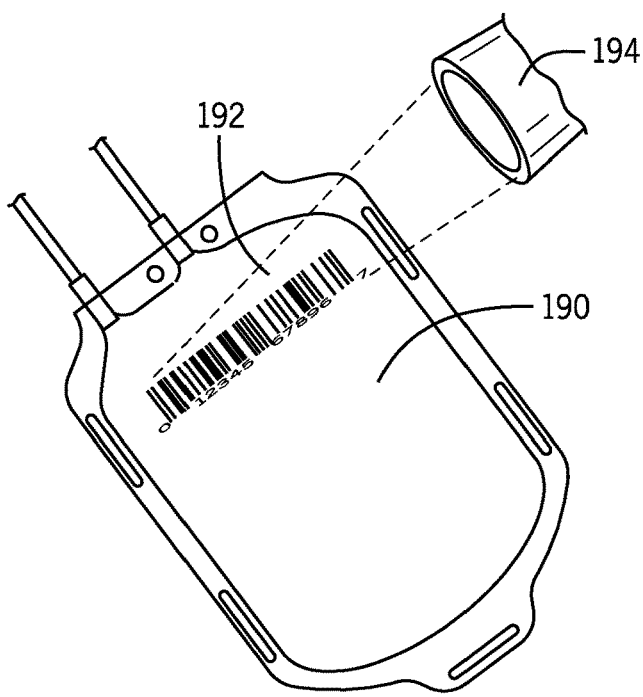

Referring now to FIGS. 8 and 9, perspective views of a bar code scanner and scanning a bar code are shown. FIG. 8 illustrates components of a bar code scanner according to an exemplary embodiment. Bar code scanner 800 comprises a computer having a processing circuit 802, a memory circuit 804, a user interface 806 and an image sensor 808. Processing circuit 802 may comprise any analog and/or digital circuit components such as microprocessors, microcontrollers, application specific integrated circuits, programmable logic, integrated circuits, and/or other electronic components configured to carry out the steps and functions described herein. A memory circuit 804 is coupled to the processing circuit 802 and may be programmed with operating software for scanner 800, which may include algorithms and/or programs for translating, decoding, reversing, etc. data from image sensor 804. Programs may be stored on a tangible, non-transitory computer-readable memory.

Image sensor 808 may take any of the forms described herein and may be configured to take a digital image of a bar code 182 from a flexible fluid container 180. Memory circuit 804 may be configured to store a bar code definition or symbology in the form of computer readable instructions. Processing circuit 802 may be configured to identify lighter bars and darker bars of the digital image, to translate the lighter bars to dark bars of the bar code definition and to translate the dark bars to lighter bars of the bar code definition and to generate a numeric code based on the translation in view of a bar code symbology. A user interface 806 may comprise user input devices, such as push buttons, user output devices, such as displays, including LEDs, or a speaker, or devices which are both input and output devices such as a touch screen user interface. In response to user actuation of an input device, processing circuit 802 may be configured to control image sensor 808 to acquire an image of bar code 182. The numeric code translated by processing circuit 802 using the symbology and other processing in memory circuit 804 may be displayed via user interface 806 and/or transmitted to another computer for logging, further processing, reporting, etc.

In some embodiments, user interface 806 may comprise a display configured to visibly display at least one of the digital image of the bar code (which may be a positive image printed in light reflecting ink, or a reverse reflectance image) and the numeric code.

Processing circuit 802 may be configured to translate by inverting data in a data file representing the digital image and using the bar code definition or symbology in the memory to convert the inverted data to the numeric code. For example, processing circuit 802 may first receive the scanned image data, then invert or reverse any pixels indicated as being light to indicate them as being dark and vice versa. This inverted image data may then be stored in memory and then processed according to the symbology stored in memory circuit to determine the numeric or alphanumeric data encoded by the bar code.

Figure 10:
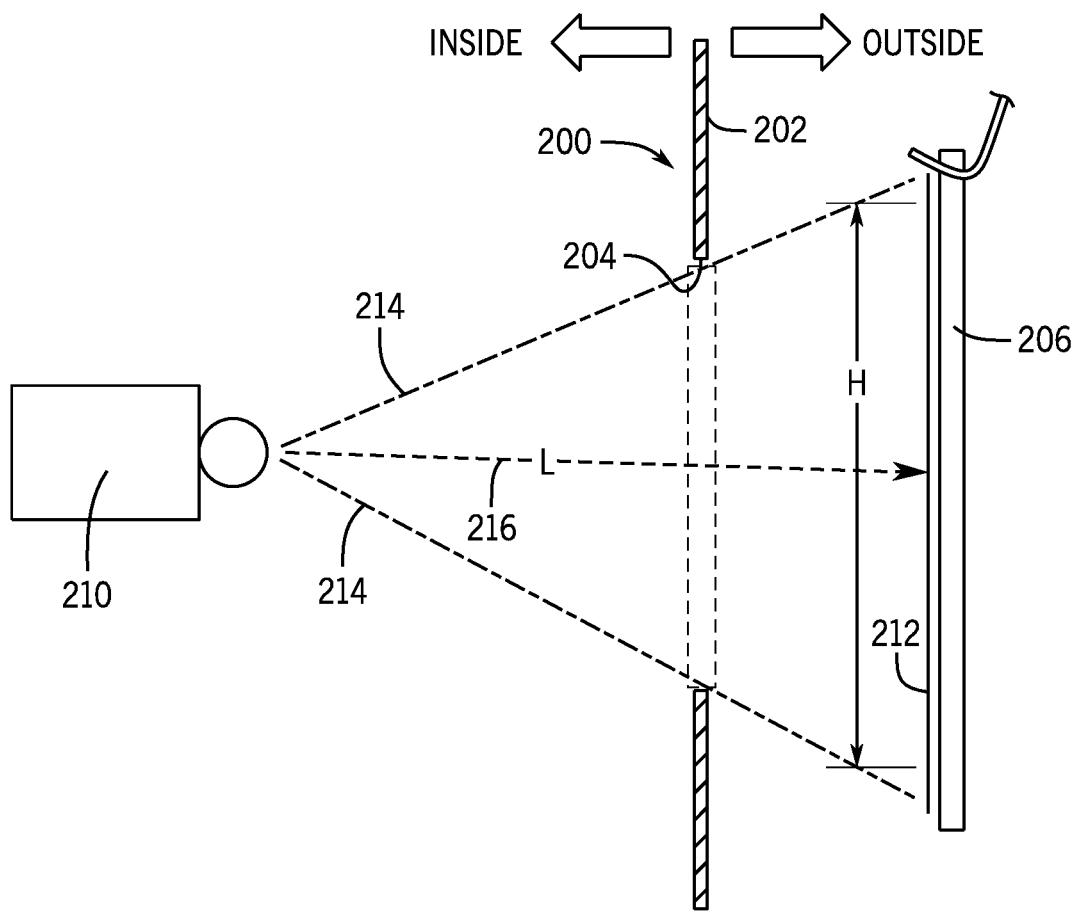
FIG. 10 is a cutaway view of a blood processing device scanning a medical solution container, according to an illustrative embodiment.

FIG. 10 illustrates an exemplary positioning of a scanner/imager in a medical fluid processing device, such as a blood processing device. As shown in partial view there, the blood processing device (e.g., apheresis device, plasmapheresis device, blood treatment device, etc.) has a housing 200 with a wall 202 and an aperture in the wall forming a window 204. The window is located adjacent to where a container 206, such as a blood or blood component container, additive solution container or other container, would hang when suspended from a hanger 208 or other suspension member (e.g., a clamp) on the processing device. The window 204 may employ glass that is shielded against electromagnetic interference. Scanner 210 may be located within the housing 200, behind window 204.

Scanner 210 may be of any suitable design or employ any suitable technology for scanning, imaging or otherwise capturing two dimensional bar codes, one dimensional bar codes, and/or blood container labels, as described herein. For example, the scanner 210 may employ a laser, camera, CCD scanner, or other suitable imaging or scanning device or technology. One non-exclusive example of an imager/scanner that may be employed here is the model JE-227 scan engine or similar device from Jadak Technologies, Inc., with offices in North Syracuse, N.Y.

As noted above, the scanner 210 is preferably mounted within the housing 200 for protection and positioned to optically view or scan the container 206 through the window 204. The scanner is positioned so that it scans or images a particular surface area of the container. More specifically, the scanner may be positioned to image a label 212 on the surface of the container facing the window, which label has information to be recorded as part of a process record. The information could be in the form of or encoded in a bar code. In the medical field in general and in the field of blood collection and processing in particular, aspects of the container and container label may be subject to certain requirements of regulatory or standard-setting bodies.

Advantageously the scanner 210 in the illustrated embodiment may be configured to image the entire or substantially the entire label 212 including, if present on the label, a bar code, for product information recordation. To achieve this, the scanner may be particularly positioned within the housing. In the illustrated embodiment, the scanner 210 has a field of view 214 (which can have vertical and horizontal aspects—only vertical being shown in FIG. 10) and focal length or distance 216. To image the desired surface area of a solution container, a scanner having a vertical field of view of about 30-40 degrees and an equal or larger horizontal field of view, could be positioned about 6-8 inches (about 15-20 cm) from the surface of a suspended container. This configuration may vary based on the size of the particular area to be imaged and the particular scanner employed, without departing from the present disclosure.

EXAMPLE

A positive image of a GS1 DataMatrix bar code was printed in white (unprinted surface area) on a black background on paper. A 2D bar code scanner attached to an Aurora 6R4601 plasmapheresis machine was used to scan the code. A Microscan verifier was used to successfully decode the data.

The arrangements of the embodiments as shown are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited herein. Accordingly, all such modifications are intended to be included within the scope of the present disclosure as described herein. The order sequence of any process or method steps may be varied or re-sequenced according to alternative embodiments. Other substitutions, modifications, changes, and/or omissions may be made in the design, operating conditions and arrangement of the preferred and other exemplary embodiments without departing from the scope of the present disclosure as expressed herein. It should also be understood that changes in the embodiments to the disclosed invention are meant to be included as coming within the scope of the claims.

What is claimed is:

1. A method of printing a code on a flexible medical solution container, comprising:
   providing a flexible medical solution container which is at least partially light transmissive;
   storing in a memory circuit a code comprising numbers;
   translating the code comprising numbers using a bar code symbology, the bar code symbology defining dark areas and light areas;
   applying a light-reflective ink to the container based on the bar code symbology, wherein the light-reflective ink is applied in areas defined by the dark areas; and
   applying a light-absorbing ink to the container based on the bar code symbology, wherein the light-absorbing ink is applied in areas defined by the light areas, whereby the applied light-reflective ink and light-absorbing ink results in a code which represents a reversal of the dark and light areas defined in the bar code symbology.

2. The method of claim 1, wherein the light-reflective ink and the light-absorbing ink is applied directly to a surface of the flexible fluid container.

3. The method of claim 1, further comprising fabricating the flexible fluid container to comprise a port coupled to a length of tubing.

4. The method of claim 1, wherein the translating step further comprises translating the code into a linear bar code symbology having a leading indicator of a first dark area followed by a first light area followed by a second dark area, wherein the light-reflective ink is applied to the first and second dark areas, wherein the light-absorbing ink is applied to the first light area.

5. The method of claim 1, wherein the translating step further comprises translating the code into a two-dimensional bar code symbology having a light quiet zone surrounding a data zone, wherein the light-absorbing ink is applied to the light quiet zone.

6. The method of claim 5, wherein the code is translated into a GS1 Datamatrix symbology for bar code structures.

7. A method of printing a linear bar code on a flexible medical solution container, comprising:
   providing a flexible medical solution container which is at least partially light transmissive;
   storing in a memory circuit a code comprising numbers;
   translating the code comprising numbers using a linear bar code symbology, the linear bar code symbology defining dark bars and light bars; and
   applying a light-reflective ink to the container based on the linear bar code symbology, wherein the light-reflective ink is applied in areas defined by the dark bars, whereby the applied ink results in a linear bar code which represents a reversal of the dark and light bars defined in the linear bar code symbology.

8. The method of claim 7, further comprising fabricating the flexible fluid container to comprise a port coupled to a length of tubing.

9. The method of claim 7, wherein the linear bar code symbology defines a start character comprising at least two dark bars surrounding a central light bar, wherein the applying further comprises applying the light-reflective ink to the container to provide the at least two dark bars.

10. The method of claim 7, wherein the applied light-reflective ink provides a scannable linear bar code without printing a different color of ink for the linear bar code.

11. The method of claim 7, further comprising fabricating the flexible fluid container to comprise a port coupled to a length of tubing.

12. The method of claim 7, wherein the linear bar code is a National Drug Code comprising at least ten digits.

13. The method of claim 12 wherein said code comprises numbers, alphanumeric characters, letters, symbols or other data.

14. A method of printing a code on a substrate, comprising:
   providing a substrate which is at least partially light transmissive;
   storing in a memory circuit a code to be converted or translated to a bar code to be printed;
   translating the code using a bar code symbology, the bar code symbology defining dark areas and light areas;
   applying a light-reflective ink to the substrate based on the bar code symbology, wherein the light-reflective ink is applied in areas defined by the dark areas; and
   applying a light-absorbing ink to the substrate based on the bar code symbology, wherein the light-absorbing ink is applied in areas defined by the light areas, whereby the applied light-reflective ink and light-absorbing ink results in a code which represents a reversal of the dark and light areas defined in the bar code symbology.

15. The method of claim 14 wherein said substrate is rigid.

16. The method of claim 14 wherein said substrate comprises a rigid container.

\* \* \* \* \*